Patented June 24, 1952

2,601,224

UNITED STATES PATENT OFFICE 2,601,224

PREPARATION OF DIFUNCTIONAL COMPOUNDS

Milton J. Roedel, Wilmington, Del., assignor to E. I. du Pont de Nemours and Company, Wilmington, Del., a corporation of Delaware No Drawing. Application January 5, 1951, Serial No. 204,682

7 Claims. (Cl. 260—485)

This invention relates to the synthesis of long-chain difunctional compounds. More particularly the invention relates to an improved simple method for the preparation of long-chain aliphatic difunctional compounds containing eight or more carbon atoms.

Long-chain difunctional compounds such as dibasic acids, diamines, diketones, dinitriles and like compounds have been found to be of great utility in preparing high-molecular weight condensation polymers. In particular, polyesters and polyamides are very useful for synthetic fibers and monofils, unsupported films, coated fabrics, molding resins, adhesives and like uses. These long-chain difunctional high polymer intermediates, however, can only be synthesized by costly methods and consequently their use has been limited. The purpose of this invention is to provide new and more economical methods for their preparation.

In accordance with this invention, long-chain difunctional compounds are prepared in one step by heating, at a temperature above its thermal decomposition temperature and in the substantial absence of oxygen, a dicyclic peroxide in which the peroxide group serves as a direct bridge between the two cyclic structures and in which each of the cyclic structures contains from 4 to 10 carbon atoms in the primary ring. The dicyclic peroxides have the formula:

where X is a radical of the group consisting of hydroxyl, cyano, phenyl, halogen groups, alkoxy groups containing no more than 4 carbon atoms, and alkyl groups containing no more than 4 carbon atoms, and R is a divalent radical containing from 3 to 9 carbon atoms in the unsubstituted portion of the diradical. The process may be illustrated by the following equation:

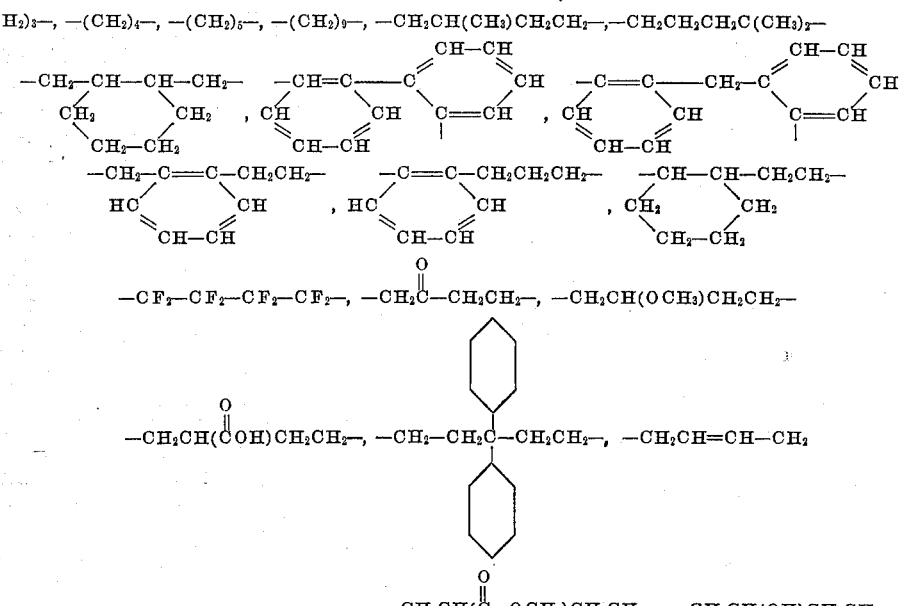

In each instance, the divalent radical R may consist of unsubstituted methylene groups or it may contain one or more substituents of the group consisting of methyl, ethyl, propyl, butyl, benzyl, phenyl, cyclohexyl, chloro, fluoro, hydroxy, methoxy, carboxy, carbalkoxy and keto. Alternately, the divalent radical R may contain one or more non-aromatic double bonds, or a phenyl or cyclohexyl substituent, for instance, may form a part of the primary ring structure. The two divalent groups in a given compound may be the same or different. Examples of various suitable divalent radicals include for instance, and like structures.

In a particular and preferred embodiment of this invention, 1,1'-dihydroxydicyclopentyl peroxide is heated to a temperature above 100° C. to produce sebacic acid.

In another particular and preferred embodiment of the invention, 1,1'-dihydroxycyclohexyl peroxide is heated at a temperature above 100° C. to produce dodecanedioic acid in one step.

The dicyclic peroxide compounds employed as starting materials herein may be readily prepared by addition of hydrogen peroxide to the keto group of a suitable cyclic ketone, in accordance with the following formula:

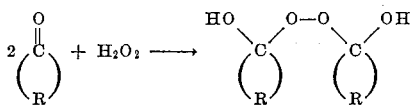

as described in U. S. Patent 2,298,405, or by peroxidation of a tertiary hydrogen atom

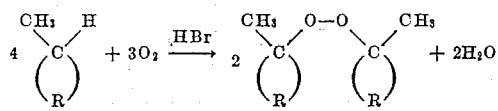

as described in U. S. Patent 2,343,888. Other methods common to the art include the esterification of a hydroperoxide with an alcohol, metathesis between an alkali salt of a hydroperoxide and a halogen atom, addition of a hydroperoxide to an olefin double bond, and the condensation of two hydroperoxide groups with the elimination of hydrogen peroxide as described in U. S. Patent 2,552,016.

We have found surprisingly that, when the disclosed dicyclic peroxide compounds are heated above their decomposition temperature in the absence of oxygen, decomposition of the peroxide linkage occurs followed by dimerization to a difunctional compound as represented in the following equations:

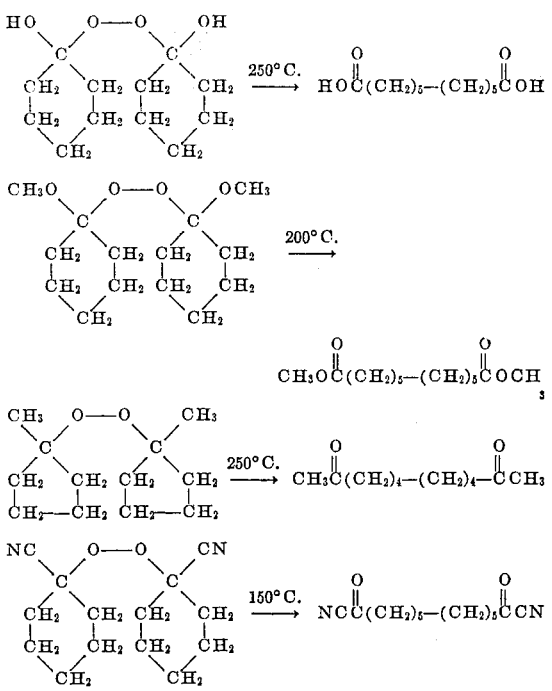

As can be seen, this novel route to long-chain difunctional compounds yields dibasic acids directly for polyester or polyamide syntheses. Likewise diesters of long-chain dibasic acids can be prepared for polyester synthesis by ester interchange with a glycol. Also the long-chain diketones can be readily oxidized to dibasic acids with sodium hypochlorite, nitric acid, oxygen or other oxidizing agents or reductively aminated with ammonia or a primary or secondary amine to a diamine. Furthermore, the diketonitriles obtained can be heated with loss of two moles of carbon monoxide to give a dinitrile which can be hydrogenated to a long-chain primary diamine.

The conversion of the dicyclic peroxide compounds to long-chain difunctional derivatives can be carried out in the vapor phase, in bulk, i. e., in the absence of a solvent, or in the presence of water or a solvent. Solvents which may be employed include methanol, ethanol, tertiary butyl alcohol, benzene, dimethyl ether, diethyl ether, methyl acetate, acetone, dioxane, cyclohexane and the like, and mixtures thereof, together with water if desired, the preferred solvents being benzene and tertiary butyl alcohol. The reaction medium should be one which is relatively inert to free radical attack under the conditions employed.

Temperatures in the range of 75° C. to 350° C., or higher, are suitable. Preferably temperatures of about 100° C. to 300° C. are employed. The reaction may be carried out under basic, neutral, or acidic conditions. A wide range of pressures may be employed. Autogenous pressures or higher superatmospheric pressures may be advantageous where, for instance, it is desired to maintain the liquid phase.

The difunctional compounds prepared by this invention can readily be separated from the reaction mixture by conventional methods such as in the form of salts of the carboxylic acid, by distillation, by ion exchange techniques, by extraction, by adsorption, by esterification, by hydrolysis of esters to free acids, and the like.

It is essential that all but traces of oxygen be absent, since oxygen inhibits the dimerization step until it has been used up, thus decreasing the yield to difunctional compound. Caution should be observed in handling any dicyclic peroxide since some members of the series are highly explosive and are sensitive to shock.

Further details of this invention are set forth in the following examples which are intended to illustrate the invention, but not to restrict its scope.

*Example 1.*—Ten grams of 1,1'-dihydroxydicyclohexyl peroxide-1,1' in 50 ml. of benzene was placed in a 325 ml. stainless steel shaker tube, flushed with nitrogen and evacuated to remove the remaining oxygen. The tube was then rapidly heated to 350° C. and allowed to cool to room temperature. The contents were then discharged and the benzene evaporated off of the crude dibasic acid. The dibasic acid was then dissolved in dilute aqueous sodium hydroxide, filtered and precipitated with dilute hydrochloric acid. The dibasic acid obtained was then recrystallized from hot water. Yield=3.4 grams of dodecanedioic acid ($HOOC(CH_2)_{10}COOH$) identified by its melting point of 127° C. and its mixed melting point of 127° C. with an authentic sample of dodecanedioic acid and its neutral equivalent of 115.

*Example 2.*—Example 1 was repeated during using 50 ml. of deoxygenated water in place of the benzene. Yield=2.9 grams of dodecanedioic acid.

*Example 3.*—Example 1 was repeated using five grams of 1,1'-dihydroxydicyclopentyl peroxide-1,1' in place of the 1,1'-dihydroxydicyclohexyl peroxide-1,1. A 3.2 gram yield of sebacic acid was obtained which was identified by its mixed melting point with an authentic sample of sebacic acid.

*Example 4.*—Twenty-five grams of 1,1'-dimethyldicyclopentyl peroxide-1,1' was added dropwise under a blanket of nitrogen to a flask immersed in a Wood's metal bath at 200° C. over a five-minute period. The residue was then dissolved in hot acetone, treated with carbon black, filtered and cooled. The crystalline compound obtained in 5.6 gram yield had a melting point of 68° C. and was identified as dodecanedione-2,11 by its oxidation to sebacic acid with sodium hypobromite.

*Example 5.*—Example 4 was repeated using ten grams of 1,1'-dimethoxydicyclopentyl peroxide-1,1' in place of the 1,1'-dimethyldicyclopentyl peroxide-1,1'. The yield was 6.4 grams of dimethyl sebacate.

The process of this invention can be carried out batchwise, semi-continuously or continuously. For reasons of safety it is preferred to carry out the reaction in a tubular reactor, the cold dicyclic peroxide being fed into a small bore reactor heated to 75° to 350° C. or higher, the temperature depending upon the length of the reactor and the half-life decomposition rate of the cyclic peroxide, so that no appreciable undecomposed peroxide builds up in the product isolation system.

I claim:

1. A process which comprises heating, at a temperature of from about 75° to 350° C. and in the substantial absence of oxygen, 1,1'-dihydroxydicyclohexyl peroxide-1,1' and separating dodecanedioic acid from the reaction mixture.

2. A process which comprises heating, at a temperature of from about 75° to 350° C. and in the substantial absence of oxygen, 1,1'-dimethoxydicyclopentyl peroxide-1,1' and separating dimethyl sebacate from the reaction mixture.

3. A process which comprises heating, at a temperature of from about 75° to 350° C. and in the substantial absence of oxygen, 1,1'-dimethyldicyclopentyl peroxide-1,1' and separating dodecanedione-2,11 from the reaction mixture.

4. A process which comprises heating, at a temperature of from about 75° to 350° C. and in the substantial absence of oxygen, 1,1'-dihydroxydicyclopentyl peroxide-1,1' and separating sebacic acid from the reaction mixture.

5. A process which comprises heating, at a temperature above its decomposition temperature and in the substantial absence of oxygen, a dicyclic peroxide compound containing two cyclic structures, each of which contains from 4 to 10 carbon atoms in the primary ring, said cyclic structures being directly united to each other through an oxygen-oxygen bridge and containing on the same cyclic carbon atoms as the peroxygen linkage a functional group, and separating from the resulting reaction mixture a straight-chain difunctional compound containing the same number of carbon atoms as the original dicyclic peroxide and in which the two functional groups are the same as the functional groups on said original peroxide compound.

6. A process which comprises heating, at a temperature of from 75° C. to 300° C. and in the substantial absence of oxygen, a dicyclic peroxide compound containing two cyclic structures, each of which contains from 4 to 10 carbon atoms in the primary ring, said cyclic structures being directly united to each other through an oxygen-oxygen bridge and containing on the same cyclic carbon atoms as the peroxygen linkage a functional group, and separating from the resulting reaction mixture a straight-chain difunctional compound containing the same number of carbon atoms as the original dicyclic peroxide and in which the two functional groups are the same as the functional groups on the said original peroxide compound.

7. A process which comprises heating, at a temperature above its decomposition temperature, in the substantial absence of oxygen, and in the presence of a reaction medium relatively inert to free radical attack, a dicyclic peroxide compound containing two cyclic structures, each of which contains from 4 to 10 carbon atoms in the primary ring, said cyclic structures being directly united to each other through an oxygen-oxygen bridge and containing on the same cyclic carbon atoms as the peroxygen linkage a functional group, and separating from the resulting reaction mixture a straight-chain difunctional compound containing the same number of carbon atoms as the original dicyclic peroxide compound and in which the two functional groups are the same as the functional groups on said original peroxide compound.

MILTON J. ROEDEL.

REFERENCES CITED

The following references are of record in the file of this patent:

UNITED STATES PATENTS

| Number | Name | Date |
|---|---|---|
| 2,298,405 | Milas | Oct. 13, 1942 |

OTHER REFERENCES

Milas et al.: J. Am. Chem. Soc., vol. 61, pp. 2430–2432 (1939).

George et al.: Trans. Faraday Soc., vol. 42, pp. 94–97 (1946).